United States Patent [19]

Livingston et al.

[11] Patent Number: 5,656,322
[45] Date of Patent: Aug. 12, 1997

[54] EDIBLE SPREAD WITH AQUEOUS PHASE WITH NON-GELLING THICKENER SYSTEM AND LOW PROTEIN CONTENT

[75] Inventors: Robert Middleton Livingston, Westcliff-on-Sea Essex; Ian Timothy Norton, Rushden, both of Great Britain

[73] Assignee: Van Den Bergh Foods Co., Division of Conopco Inc., Lisle, Ill.

[21] Appl. No.: 261,875

[22] Filed: Jun. 17, 1994

Related U.S. Application Data

[63] Continuation of Ser. No. 823,801, Jan. 22, 1992, abandoned.

[30] Foreign Application Priority Data

Jan. 23, 1991 [GB] United Kingdom ............ 9101461

[51] Int. Cl.⁶ .................................................. A23D 7/00
[52] U.S. Cl. ........................ 426/603; 426/575; 426/578; 426/661
[58] Field of Search ...................... 426/601, 602, 426/603, 575, 661, 578, 657

[56] References Cited

U.S. PATENT DOCUMENTS

| | | | |
|---|---|---|---|
| 4,305,970 | 12/1981 | Moran et al. | 426/603 |
| 4,308,294 | 12/1981 | Rispoli et al. | 426/564 |
| 4,443,487 | 4/1984 | Darling | 426/603 |
| 4,587,131 | 5/1986 | Bodor et al. | 426/603 |
| 4,591,507 | 5/1986 | Bodor et al. | 426/507 |
| 5,094,872 | 3/1992 | Furcsik | 426/578 |
| 5,126,161 | 6/1992 | Poppe et al. | 426/573 |
| 5,294,455 | 3/1994 | O'Brien | 426/603 |

FOREIGN PATENT DOCUMENTS

| | | | |
|---|---|---|---|
| 076549 | 4/1983 | European Pat. Off. . | |
| 098174 | 1/1984 | European Pat. Off. . | |
| 146174 | 6/1985 | European Pat. Off. . | |
| 293980 | 12/1988 | European Pat. Off. . | |
| 365738 | 5/1990 | European Pat. Off. . | |
| 0474299A1 | 3/1992 | European Pat. Off. | A23D 7/00 |
| 1566665 | 3/1969 | France . | |
| 2244717 | 12/1991 | United Kingdom . | |
| 2280196 | 1/1995 | United Kingdom | A23D 7/015 |
| 81/01353 | 5/1981 | WIPO . | |

OTHER PUBLICATIONS

Research Disclosure, No. 313, p. 452, XP000114927 (May 1, 1990).
Research Disclosure, No. 302, pp. 458–460, XP000035114 (Jun., 1989).

*Primary Examiner*—Carolyn Paden
*Attorney, Agent, or Firm*—Cushman Darby & Cushman, IP Group Pillsbury Madison & Sutro, LLP

[57] ABSTRACT

Edible spreads having a reduced fat level produced from a continuous fat phase and a dispersed aqueous phase containing a non-gelling, non-proteinaceous thickener system such that the viscosity of the aqueous phase is 30–4000 mPas and the awueous phase contains 0.01–4% by weight protein.

11 Claims, No Drawings

EDIBLE SPREAD WITH AQUEOUS PHASE WITH NON-GELLING THICKENER SYSTEM AND LOW PROTEIN CONTENT

This is a continuation of application Ser. No. 07/823,801, filed on Jan. 22, 1992, which was abandoned upon the filing hereof.

FIELD OF INVENTION

The present invention relates to edible spreads, more particularly to edible spreads having a reduced fat level. The invention will be described with particular reference to 'low-fat' spreads having a continuous fat phase comprising some 40 wt % fat on product and a disperse water phase comprising some 60 wt % water-phase on product.

Edible spreads having a 40 % wt fat content are well known in the art and have enjoyed considerable commercial success. It is commonplace for such edible spreads to have a thickened or gelled aqueous phase. Numerous components have been proposed as thickeners, including gelling polysaccharides such as carrageenan, modified starches and calcium alginate, and gelling proteins such as gelatine.

For many years gelatine has enjoyed a pre-eminent role in the aqueous phase of reduced fat spreads. Gelatine, as compared to most other gelling agents and particularly as compared to the majority of gelling polysaccharides, offers the advantage that it has a melting point close to mouth temperature and that spreads containing gelatine consequently disperse rapidly in the mouth, releasing salt and water soluble flavour components. However, gelatine is a protein recovered from the connective tissue of animals and must be extensively purified before use in spreads. Gelatine is not acceptable to some consumers as it is an animal product. Only certain grade of gelatine are suitable for use in spreads and these are not only increasingly expensive but in increasingly short supply. There is a clear need for a gelatine replacer which is not only inexpensive, but preferably also a non-animal product.

DESCRIPTION OF RELATED ART

European Patent Application EP 0,365,738 (Waterford Co-operative Dairy and Trading Society) discloses low fat spreads prepared from an aqueous phase comprising water, a gelling agent, salt, lactic acid and protein at a level of 0.1–0.4% on aqueous phase. The specification states that a protein content in this range gives a particularly good set of organoleptic properties. It should be noted that while gelatine is the preferred gelling agent in EP 0,365,738, the possible use of other gelling agents is envisaged: it is stated that "instead of gelatine, sodium alginate may be used as a gelling agent" (page 4, line 29). It is observed that sodium alginate will not gel in the absence of calcium ions or another divalent species; a fact well known to the man skilled in the art. Sodium alginate cannot therefore be described as a 'gelling agent'.

Non-gelatine systems are also disclosed in the research disclosures of Grindsted, the well-known Danish emulsifier company. One such disclosure relates to the use of low-protein/sodium alginate systems in the production of low fat spreads. From the process aspects of this disclosure it is apparent that the product is of a water-continuous nature. Water-continuous products differ markedly from fat-continuous products and in particular are far more sensitive to microbiological spoilage on storage. While fat-continuous products are known to be more stable on storage, the water-continuous products have the advantage of rapid flavour release on consumption. A major difficulty with fat-continuous products is ensuring rapid flavour release in the mouth. As mentioned above, certain combinations of proteins and gelling agents have been proposed to ensure adequate stability on storage and adequate flavour release on consumption. Further combinations which provide rapid flavour release without undesirable organoleptic properties have proved difficult to find.

SUMMARY OF THE INVENTION

We have now determined that acceptable fat-continuous spreads may be prepared with a non-gelling thickener, provided that the overall protein level in the aqueous phase of the spreads is low.

According to a first aspect of the present invention there is provided an edible spread comprising a continuous fatty phase and a dispersed proteinaceous aqueous phase, characterised in that, the aqueous phase comprises a quantity of a non-gelling, non-proteinaceous thickener system such that the viscosity of the aqueous phase falls in the range 30–4000 mPas when measured in a Haake RV20 with a concentric cylinder geometry at 100 rps, at 20 degrees centigrade, and further characterised in that the aqueous phase contains 0.01–4% protein on aqueous phase, preferably 0.1–1% protein on aqueous phase.

Typically, the thickener system comprises a non-gelling starch, sodium alginate or a mixture thereof.

While the presence of other gelling and or thickening agents is not hereby excluded, preferred embodiments of the present invention are free of gelling agents.

DESCRIPTION OF PREFERRED EMBODIMENTS

Products within the scope of the present invention comprise less than 80% wt of a fat phase. Preferably, products comprise 1–70% wt, preferably 20–50% and most preferably around 40% wt of an aqueous phase. Products comprising around 40% fat have approximately half the fat content of butter or margarine.

Particularly preferred thickener systems comprise sodium alginate at a level of 0.1–3% on aqueous phase.

In preferred embodiments of the invention, the aqueous phase viscosity falls in the range 200–1400 mPas when measured by the method specified above.

In preferred embodiments of the invention, the aqueous phase protein content falls in the range 0.05–0.5% on aqueous phase.

Generally, the protein will be a milk-protein, caseinates and whey proteins being particularly preferred. In embodiments of the invention which completely exclude animal products, vegetable proteins such as soy-proteins can be employed. It is preferred that the protein should be well-dispersed in the aqueous phase. Preferably any undissolved protein should be in particles of a number-averaged long-dimension of less than 10 microns.

Products comprising a mixture of starch, protein and alginate have been found to be particularly advantageous. Preferred products comprises, as a thickener system, combination of 2–5% wt starch on product, 0.05–0.5% wt protein on product and 0.2–0.4% wt sodium alginate on product.

The fat phase of the product can be of any type used for low fat spreads and preferably comprises a both a liquid vegetable oil component and a so-called vegetable 'hardstock'. Suitable vegetable oils include sunflower oil, soybean oil and other oils rich in polyunsaturated fatty acids. As an alternative to the use of vegetable oils and fats both dairy fats and mixtures of vegetable and dairy fats can be employed. It is also possible to use a hardened fish or other animal oil as the hardstock component. The solids content of the fat blend is preferably similar to that used for conventional edible spreads. Particularly good results were obtained when the solids content at the indicated temperatures was:

10° C. 10–20%
20° C. 6–11%
30° C. 2–4%

In order that the invention may be further understood it will be described hereafter by way of example.

EXAMPLES

Example 1

A spread was prepared at laboratory and pilot plant scale with the following overall formulation:

Water Phase:
  Sodium Alginate (Manugel DMB) 1.8%
  NaCl 1.0%
  Potassium Sorbate 0.15%
  Buttermilk Powder (protein source) 0.8%
  Water 55.4%
  Citric Acid to pH 5.0

Fat Phase:
  Fat blend 39.6%
  Emulsifier (Hymono 8903) 0.2%
  Emulsifier (BOLEC Z) 0.2%
  Colour and flavour (trace)

Dry aqueous phase ingredients were mixed and dispersed in de-ionised water. The mix was heated to 70 degrees centigrade and held at this temperature for 10 minutes before cooling to 50 degrees centigrade. The pH was adjusted to 5.0 by the addition of citric acid. The fat phase was prepared at 50 degrees centigrade and added to the aqueous phase to form a pre-mix.

The premix was Pasteurised and processed through an ACAC sequence of VOTATOR (RTM) A-units and C-units. The exit temperatures of the units were 5, 18, 6 and 9 degrees centigrade respectively. The throughput at pilot-plant scale was 90 kg/hr.

The products had a D3,3 (as defined by the method of Alderliesten) of 10–13 microns, margarine-like spreadability and conductivities indicative of a fat continuous character. Products destabilised rapidly in the mouth releasing flavour and salt.

The above mentioned example was repeated with sodium alginate levels of 0.6%, 1.2% and 1.8% by weight of total product, and with sodium caseinate levels of 0.006%, 0.06% and 0.3% by weight of total product. All products exhibited good spreading characteristics and a disperse water phase of droplet size D3,3, close to 10 microns.

Example 2

A spread was prepared at factory scale with the following overall formulation, using conventional spread processing equipment and a phase-inversion process:

Fat Phase:
  Fat blend 39.2%
  Emulsifier (Hymono 8903) 0.2%
  Colour and flavour (trace)

Water Phase:
  Sodium Alginate (Manugel DH) 0.4%
  NaCl 1.0%
  Sorbic Acid 0.1%
  Sodium Caseinate (protein source) 0.2%
  Milk powder or buttermilk powder 1.5%
  Paselli Starch (SA-2) 4.0%
  Water to 100%
  Lactic Acid to pH 4.9–5.1

Samples were prepared with a range of fat phases including a simple fat phase comprising unmodified sunflower oil and a partially hardened soybean oil, and a more complex fat phase comprising unmodified sunflower oil and an interesterified mixture of hardened palm and palm kernel oils. Samples were also prepared with starch levels ranging from 3–4%.

All the above mentioned products exhibited good spreading characteristics and the presence of a disperse water phase was indicated by conductivity measurements.

We claim:

1. A gelatin-free edible low-fat spread consisting essentially of less than 80% wt of a continuous fatty phase with the balance being a dispersed proteinaceous aqueous phase, wherein the aqueous phase contains (a) 0.01–4% by weight of protein based on the weight of the aqueous phase and (b) a non-gelling, non-proteinaceous thickener consisting essentially of non-gelling hydrolyzed starch and sodium alginate in an amount such that the viscosity of the aqueous phase falls in the range 30–4000 mPas when measured at 20 degrees centigrade, the hydrolyzed starch and sodium alginate being present in the amount of 2–5 wt % starch and 0.2–0.4 wt % sodium alginate, based on the weight of the spread, said thickener having a melting point close to mouth temperature whereby the spread is characterized by its rapid flavor release on consumption.

2. Product according to claim 1 wherein the aqueous phase contains sodium alginate at a level of 0.1–3% wt.

3. Product according to claim 1 wherein the aqueous phase viscosity falls in the range 200–1400 mPas.

4. Product according to claim 1 wherein the aqueous phase contains 0.05–0.5% wt protein.

5. product according to claim 1 wherein the proteinaceous components of the aqueous phase are milk-proteins.

6. Spread according to claim 1 wherein the thickener consists of 2–5% wt starch, 0.05–0.5% wt protein and 0.2–0.4% wt sodium aliginate.

7. A gelatin-free edible low fat spread consisting essentially of less than 80 wt % of a continuous fatty phase and the balance being a dispersed proteinaceous aqueous phase, wherein the aqueous phase contains 0.01–4% by weight thereof of protein and said aqueous phase is thickened by a non-gelling, non-proteinaceous thickener mixture consisting of sodium alginate and starch, the amount of said non-proteinaceous thickener mixture being such that the viscosity of the aqueous phase falls in the range of 30–4000 mPas, the viscosity being measured in a Haake RV20 with a concentric cylinder geometry at 1000 rps at 20 degrees centigrade.

8. An edible spread according to claim 7 comprising 1–70 wt % of said aqueous phase calculated on the spread.

9. An edible spread according to claim 7 comprising 20–50 wt % of said aqueous phase calculated on the spread.

10. An edible spread according to claim 7 comprising 0.05–0.5 wt % of protein calculated on the aqueous phase.

11. An edible spread according to claim 7 or 10 wherein the protein is milk protein.

* * * * *